United States Patent
Yamane

(10) Patent No.: US 7,333,925 B2
(45) Date of Patent: Feb. 19, 2008

(54) MANUFACTURING METHOD AND MANUFACTURING APPARATUS OF PIPE, THICKNESS DEVIATION INFORMATION DERIVATION APPARATUS, AND COMPUTER PROGRAM

(75) Inventor: Akihito Yamane, Osaka (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 0 days.

(21) Appl. No.: 11/502,558

(22) Filed: Aug. 11, 2006

(65) Prior Publication Data

US 2006/0272373 A1 Dec. 7, 2006

Related U.S. Application Data

(62) Division of application No. 11/222,798, filed on Sep. 12, 2005, now Pat. No. 7,093,469.

(30) Foreign Application Priority Data

Mar. 14, 2003 (JP) ............................. 2003-070356
Mar. 11, 2004 (JP) ................. PCT/JP2004/003238

(51) Int. Cl.
*B21B 37/78* (2006.01)
*G06G 7/48* (2006.01)

(52) U.S. Cl. ............................ 703/9; 702/170; 378/54; 72/9.2; 72/9.4; 72/11.8; 72/31.06; 72/235

(58) Field of Classification Search ................... 72/8.9, 72/9.2, 9.4, 11.6, 11.8, 12.7, 31.06, 37, 234, 72/235, 226; 702/170; 73/622; 378/54, 378/59; 703/6, 7, 9; 700/148, 150
See application file for complete search history.

(56) References Cited

U.S. PATENT DOCUMENTS

| 4,099,418 | A | 7/1978 | Bennett et al. |
|---|---|---|---|
| 4,196,607 | A | 4/1980 | Youtsey et al. |
| 6,600,806 | B1 | 7/2003 | Istar |
| 6,666,094 | B1 | 12/2003 | Sauerland |
| 6,945,083 | B2 | 9/2005 | Sauerland et al. |
| 2001/0032064 | A1 | 10/2001 | Araki et al. |
| 2004/0034501 | A1 | 2/2004 | Sauerland et al. |

(Continued)

FOREIGN PATENT DOCUMENTS

AR 038228 A1 1/2005

(Continued)

*Primary Examiner*—Dmitry Suhol
(74) *Attorney, Agent, or Firm*—Clark & Brody

(57) ABSTRACT

A complex Fourier transform is performed on measured values of wall thickness at points in a cross section of a pipe in an axial direction, types of thickness deviation are classified, thickness deviation amount is calculated from the absolute value of the complex Fourier component, the position of a thick or thin portion of thickness deviation is calculated from the phase of the complex Fourier component, and manufacturing conditions of the pipe are adjusted based on these variables. The relationship $r \cdot \exp(j\theta)$ between the thickness deviation amount $r$ and phase $\theta$ of a first-order thickness deviation obtained for cross sections in the axial direction is subjected to a complex Fourier transform as a function of pipe longitudinal direction, the thickness deviation is further classified by the frequency of twist of the thickness deviation, and an action is taken to prevent the thickness deviation according to the classified thickness deviation.

12 Claims, 10 Drawing Sheets

U.S. PATENT DOCUMENTS

2004/0255678 A1* 12/2004 Nagashima et al. .......... 73/620

FOREIGN PATENT DOCUMENTS

| | | |
|---|---|---|
| EP | 1 102 033 A2 | 5/2001 |
| JP | 59-7407 | 1/1984 |
| JP | 59159218 | 9/1984 |
| JP | 60-261614 | 12/1985 |
| JP | 61-056709 | 3/1986 |
| JP | 61-135409 | 6/1986 |
| JP | 8-271241 | 10/1996 |
| JP | 2001-293503 | 10/2001 |

* cited by examiner

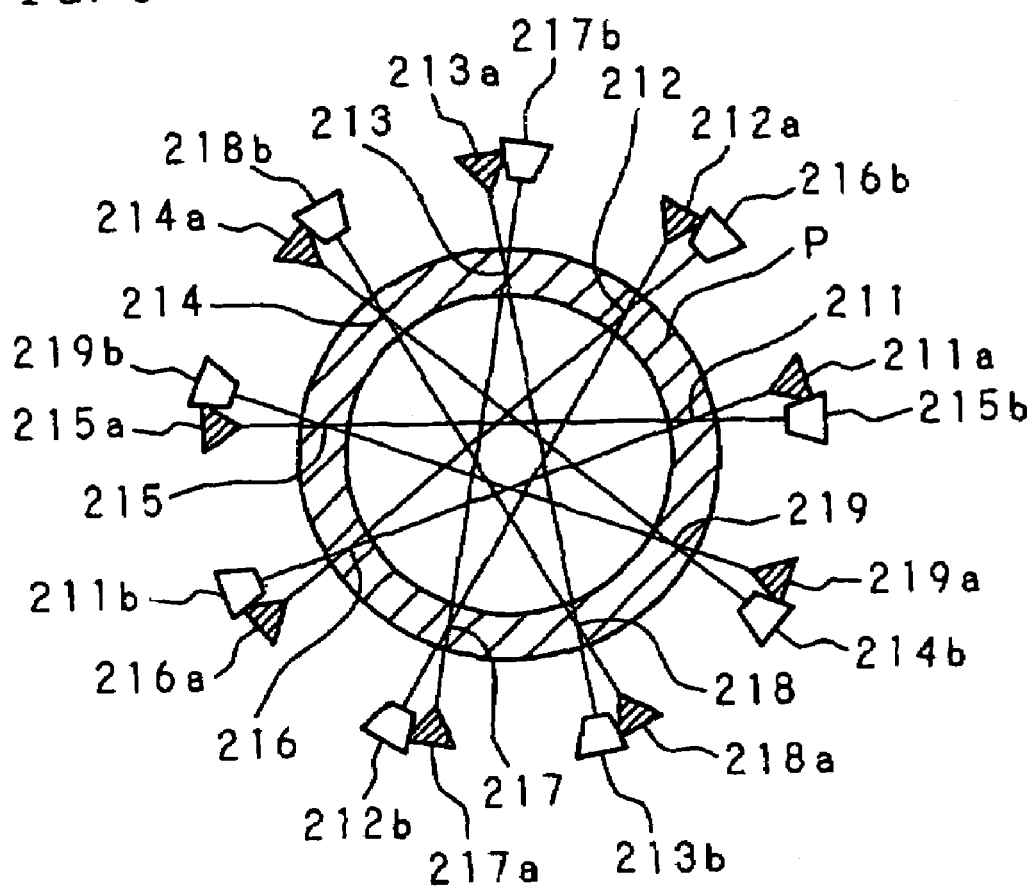

FIG. 10

| CONDITION | (a) | (b) | (c) | (d) | (e) | (f) | (g) |
|---|---|---|---|---|---|---|---|
| RATIO OF OCCURRENCE OF THICKNESS DEVIATION | 2% | 5% | 3% | 4% | 8% | 25% | 40% |

MANUFACTURING METHOD AND MANUFACTURING APPARATUS OF PIPE, THICKNESS DEVIATION INFORMATION DERIVATION APPARATUS, AND COMPUTER PROGRAM

CROSS-REFERENCE TO RELATED APPLICATIONS

"This application is a Divisional of U.S. patent application Ser. No. 11/222,798, now U.S. Pat. No. 7,093,469 filed Sep. 12, 2005, which is a Continuation of International Application Number PCT/JP2004/003238, filed Mar. 11, 2004, which was published in Japanese, and claims priority of Japanese Patent Application Number 2003-070356, filed Mar. 14, 2003."

This application is a continuation of PCT International Application No. PCT/JP2004/003238 which has an International filing date of Mar. 11, 2004 and designated the United States of America.

BACKGROUND OF THE INVENTION

1. Field of the Invention

The present invention relates to a manufacturing method/manufacturing apparatus for manufacturing a seamless pipe while preventing occurrence of thickness deviations, a thickness deviation information derivation apparatus for deriving information about a thickness deviation, and a computer program for realizing a computer as the thickness deviation information derivation apparatus.

2. Description of Related Art

A typical example of a manufacturing method of seamless pipes is a method using a mandrel mill. In this method, first, a billet heated to a required temperature in a heating furnace is pierced and rolled by a piercing mill to obtain a hollow shell, next the hollow shell is elongated and rolled using the mandrel mill, and then sizing rolling to adjust the external diameter and wall thickness is performed using a reducing mill or a sizing mill.

In a seamless pipe manufactured by the above-mentioned process, various types of thickness deviations as shown in FIG. 1A and FIG. 1B may occur. FIG. 1A and FIG. 1B are cross sectional views of a seamless pipe with various types of thickness deviations. FIG. 1A shows cross sections in the direction of the axis of the seamless pipe, and FIG. 1B shows a cross section including the central axis of the seamless pipe. Various factors are listed as the causes of the thickness deviations. Among them, as a factor related to manufacturing equipment, for example, misalignment between the central axis of a plug for use in piercing and the central axis of the billet, or uneven heating temperature of the billet due to insufficient heating in the heating furnace, is listed. A first-order thickness deviation is caused by this factor. On the other hand, a second-order thickness deviation and a fourth-order thickness deviation are caused by the misalignment of the roll position from a set target position in the mandrel mill and the deviation of the radius of a mandrel bar used in the mandrel mill from an appropriate value. Moreover, a third-order thickness deviation and a sixth-order thickness deviation are caused by tool defects in the reducing mill or the sizing mill. Further, as shown in FIG. 1B, there is a deviation of wall thickness changing in the longitudinal direction. A possible cause of this thickness deviation is a deviation due to inclined rolling, such as, for example, the above-mentioned first-order thickness deviation caused by the piercing mill.

In order to prevent occurrence of such thickness deviations, it is necessary to measure the wall thickness of a manufactured seamless pipe, know the state of a thickness deviation, when it is detected, specify the cause of the thickness deviation, and adjust the manufacturing equipment or manufacturing conditions to eliminate the specified cause.

Japanese Patent Application Laid-Open No. 59-7407 (1984) discloses a technique of dividing the cause of a first-order thickness deviation that occurs in an inclined rolling mill, such as a piercing mill, by noticing the degree of twist of a thin portion in a cross section of a seamless pipe in the longitudinal direction. On the other hand, Japanese Patent Application Laid-Open No. 61-135409 (1986) discloses a technique of determining the cause of thickness deviation by measuring the wall thickness of a seamless pipe spirally and analyzing a first-order thickness deviation, a third-order thickness deviation of a 120° cycle, and a second-order thickness deviation of a 180° cycle by Fourier analysis of the measurement results. Further, Japanese Patent Application Laid-Open No. 8-271241 (1996) discloses a technique in which two gamma rays are passed through a seamless pipe, and a first-order thickness deviation is specified based on the difference between the attenuation amounts of the two gamma rays.

In the prior arts mentioned above, the technique disclosed in Japanese Patent Application Laid-Open No. 59-7407 (1984) has the problem that, when there are various types of thickness deviations, it is difficult to determine the form of twist of the first-order thickness deviation. On the other hand, since the technique disclosed in Japanese Patent Application Laid-Open No. 61-135409 (1986) does not disclose a method of analyzing the position of a thickness deviation in the circumferential direction, this technique has the problem that it is impossible to determine an adjustment position where manufacturing conditions are to be adjusted to prevent the thickness deviation, and an adjustment amount. Further, it does not disclose specific measures to prevent a fourth-order thickness deviation of a 90° cycle, a sixth-order thickness deviation of a 60° cycle, etc. Additionally, the technique disclosed in Japanese Patent Application Laid-Open No. 8-271241 (1996) has the problem that it is impossible to divide an even-number-order thickness deviation and an odd-number order thickness deviation.

BRIEF SUMMARY OF THE INVENTION

The present invention has been made with the aim of solving the above problems, and it is an object of the present invention to provide a manufacturing method/manufacturing apparatus of seamless pipes, capable of preventing occurrence of thickness deviation by classifying the type of thickness deviation by performing a complex Fourier transform on measured values of wall thickness measured at a plurality of points in a cross section in an axial direction of the pipe, calculating the position of thickness deviation, from the phase of a complex Fourier component, and adjusting the manufacturing conditions or manufacturing equipment of the pipe, and to provide a thickness deviation information derivation apparatus for deriving information about thickness deviation, and a computer program for realizing the thickness deviation information derivation apparatus by a computer.

More specifically, the object of the present invention is to provide a manufacturing method/manufacturing apparatus of seamless pipes, capable of preventing occurrence of thickness deviation by adjusting the manufacturing conditions or manufacturing equipment of the pipe, according to the type of thickness deviation, for the first-order thickness deviation through sixth-order thickness deviation, and to provide a thickness deviation information derivation apparatus for deriving information about a thickness deviation, and a computer program for realizing the thickness deviation information derivation apparatus by a computer.

Further, it is another object of the present invention to provide a manufacturing method/manufacturing apparatus of seamless pipes, capable of preventing occurrence of thickness deviation by determining the form of twist of a thickness deviation in a longitudinal direction of the pipe by performing a complex Fourier transform in the longitudinal direction on the thickness deviation amount and phase obtained for a cross section of the pipe in the axial direction, and adjusting the manufacturing conditions or manufacturing equipment of the pipe according to the form of twist, and to provide a thickness deviation information derivation apparatus for deriving information about a thickness deviation, and a computer program for realizing the thickness deviation information derivation apparatus by a computer.

A manufacturing method of seamless pipes according to the first invention is a method of manufacturing seamless pipes while adjusting wall thickness based on measured values of wall thickness of a pipe, and characterized by comprising: a step of measuring the wall thickness at a plurality of points in a circumferential direction in a cross section of the pipe in an axial direction; a first calculation step of calculating a complex Fourier component of each k-th-order thickness deviation of the wall thickness that changes periodically k times (k is a natural number) in one turn by performing a complex Fourier transform in the circumferential direction on a plurality of measured values of the wall thickness; a second calculation step of calculating a thickness deviation amount indicating a degree of thickness deviation of each k-th-order thickness deviation, from an absolute value of the calculated complex Fourier component; a third calculation step of calculating a position of a thick portion or thin portion of each k-th-order thickness deviation, from a phase of the calculated complex Fourier component; and an adjustment step of adjusting the wall thickness of the pipe, based on the thickness deviation amount and/or the position of the thick portion or thin portion, according to a method suited to each k-th-order thickness deviation.

A manufacturing method of seamless pipes according to the second invention is characterized in that, in the first calculation step, a real part R(k) and an imaginary part I(k) of the complex Fourier component of each k-th-order thickness deviation are calculated by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, and, in the second calculation step, a thickness deviation amount G(k) of each k-th-order thickness deviation is calculated by $$G(k) = 4\sqrt{R(k)^2 + I(k)^2}.$$

A manufacturing method of seamless pipes according to the third invention is characterized in that, in the third calculation step, a position argW(k) of the thick portion or a position argN(k) of the thin portion of each k-th-order thickness deviation is calculated with a unit of angle in which the position of a first measurement point is 0°, using the real part R(k) and imaginary part I(k) of the complex Fourier component of each k-th-order thickness deviation, by $$\arg W(k) = \frac{1}{k}\left(\tan^{-1}\frac{I(k)}{R(k)}\right)\frac{180}{\pi},$$

or $$\arg N(k) = \frac{1}{k}\left(\tan^{-1}\frac{I(k)}{R(k)} + \pi\right)\frac{180}{\pi}.$$

A manufacturing method of seamless pipes according to the fourth invention is characterized in that a mandrel mill comprising a plurality of rolling roll pairs for rolling a pipe by holding a hollow shell from outside is used, and, in the adjustment step, for a second-order thickness deviation, a distance between the rolling rolls of a rolling roll pair of the mandrel mill that roll the position of the thick portion is decreased according to the thickness deviation amount, or a distance between the rolling rolls of a rolling roll pair that roll the position of the thin portion is increased according to the thickness deviation amount.

A manufacturing method of seamless pipes according to the fifth invention is characterized in that a mandrel mill with a mandrel bar to be inserted into a hollow shell is used, and, in the adjustment step, for a fourth-order thickness deviation, the mandrel bar of the mandrel mill is replaced by a mandrel bar having an appropriate diameter according to the thickness deviation amount.

A manufacturing method of seamless pipes according to the sixth invention is characterized in that a reducing rolling mill for rolling a pipe by passing the pipe through a die formed by a plurality of rolling rolls is used, and, in the adjustment step, for a third-order thickness deviation or a sixth-order thickness deviation, the rolls of the reducing rolling mill are replaced by rolls having an appropriate shape, based on the deviation amount and/or the position of the thick portion or thin portion.

A manufacturing method of seamless pipes according to the seventh invention is a method of manufacturing seamless pipes while adjusting wall thickness based on measured values of wall thickness of a pipe, and characterized by comprising: a step of measuring the wall thickness at a plurality of points in a circumferential direction in a plurality of cross sections of the pipe in an axial direction; a step of calculating a complex Fourier component of each k-th-order thickness deviation of wall thickness that changes periodically k times (k is a natural number) in one turn by performing a complex Fourier transform in the circumferential direction on a plurality of measured values of the wall thickness in the plurality of the cross sections in the axial direction; a step of calculating a thickness deviation amount indicating a degree of thickness deviation of each k-th-order thickness deviation, from an absolute value of the calculated complex Fourier component, for the plurality of the cross sections in the axial direction; a step of calculating a phase of each k-th-order thickness deviation, from the calculated complex Fourier component, for the plurality of the cross sections in the axial direction; a step of calculating a complex Fourier component for each frequency representing the number of times the thickness deviation is twisted per unit length in a longitudinal direction of the pipe, by performing a complex Fourier transform on a complex function in which a complex number whose absolute value and phase are the thickness deviation and the phase calculated for each k-th-order thickness deviation, respectively, is a function of position in the longitudinal direction of the pipe; a step of determining whether the values of the complex Fourier component in a plurality of predetermined frequency ranges are larger or not based on a predetermined boundary value; and a step of adjusting the wall thickness of the pipe, according to a method suited to each k-th-order thickness deviation and each frequency range, when it is determined that the value of the complex Fourier component is larger in any of the frequency ranges.

A manufacturing method of seamless pipes according to the eighth invention is a method of manufacturing seamless pipes while adjusting wall thickness based on measured values of wall thickness of a pipe, and characterized by comprising: a step of measuring the wall thickness at a plurality of points in a circumferential direction in a plurality of cross sections of the pipe in an axial direction; a first calculation step of calculating a complex Fourier component of a first-order thickness deviation of the wall thickness that changes periodically once in one turn by performing a complex Fourier transform in the circumferential direction on a plurality of measured values of the wall thickness in the plurality of the cross sections in the axial direction; a second calculation step of calculating a thickness deviation amount indicating a degree of thickness deviation of the first-order thickness deviation, from an absolute value of the calculated complex Fourier component, for the plurality of the cross sections in the axial direction; a third calculation step of calculating a phase of the first-order thickness deviation, from the calculated complex Fourier component, for the plurality of the cross sections in the axial direction; a fourth calculation step of calculating a complex Fourier component for each frequency representing the number of times the thickness deviation is twisted per unit length in a longitudinal direction of the pipe, by performing a complex Fourier transform on a complex function in which a complex number whose absolute value and phase are the thickness deviation amount and the phase thus calculated, respectively, is a function of position in the longitudinal direction of the pipe; a determination step of determining whether the values of the complex Fourier component in a plurality of predetermined frequency ranges are larger or not based on a predetermined boundary value; and an adjustment step of adjusting manufacturing conditions of the pipe, when it is determined that the value of the complex Fourier component is larger in any of the frequency ranges, according to a method suited to the frequency range.

A manufacturing method of seamless pipes according to the ninth invention is characterized in that, in the first calculation step, a real part $R(1)$ and an imaginary part $I(1)$ of the complex Fourier component of the first-order thickness deviation are calculated by $$R(1) = \frac{1}{N} \sum_{i=1}^{N} \left\{ WT(i) \cos\left(\frac{2\pi}{N}(i-1)\right) \right\},$$

and $$I(1) = \frac{1}{N} \sum_{i=1}^{N} \left\{ WT(i) \sin\left(\frac{2\pi}{N} 1(i-1)\right) \right\}$$

where N is the number of measurement points at which the wall thickness is measured in the cross section in the axial direction, and $WT(i)$ is a measured value of the wall thickness at the i-th measurement point among the measurement points aligned in the circumferential direction, and, in the second calculation step, a thickness deviation amount r of the first-order thickness deviation is calculated by $$r = 4\sqrt{R(1)^2 + I(1)^2},$$

in the third calculation step, a phase $\theta$ of the first-order thickness deviation is calculated by $$\theta = \tan^{-1}\{I(1)/R(1)\},$$

and, in the fourth calculation step, a complex Fourier transform is performed on a function of y, $f(y)=r(y)\cdot\exp(j\cdot\theta(y))$, where j is an imaginary number, y is a length in the longitudinal direction of the pipe, and the r and $\theta$ are functions of y.

A manufacturing method of seamless pipes according to the tenth invention is characterized in that a heating furnace and a piercing mill are used; in the determination step, whether the value of the complex Fourier component is larger or not is determined based on a predetermined boundary value, in a range of large frequencies and a range of small frequencies based on a predetermined boundary value; and, in the adjustment step, when it is determined that the value of the complex Fourier component is larger in the range of small frequencies, a heating temperature in the heating furnace is increased, and, when it is determined that the value of the complex Fourier component is larger in the range of large frequencies, a part in the piercing mill that causes eccentricity is replaced.

A manufacturing apparatus according to the eleventh invention is an apparatus for manufacturing seamless pipes while adjusting wall thickness based on measured values of wall thickness of a pipe, and characterized by comprising: means for measuring the wall thickness at a plurality of points in a circumferential direction in a cross section of the pipe in an axial direction; first calculating means for calculating a complex Fourier component of each k-th-order thickness deviation of the wall thickness that changes periodically k times (k is a natural number) in one turn by performing a complex Fourier transform in the circumferential direction on a plurality of measured values of the wall thickness; second calculating means for calculating a thickness deviation amount indicating a degree of thickness deviation of each k-th-order thickness deviation, from an absolute value of the calculated complex Fourier component; third calculating means for calculating a position of a thick portion or thin portion of each k-th-order thickness deviation, from a phase of the calculated complex Fourier component; and adjusting means for adjusting the wall thickness of the pipe to be manufactured, based on the thickness deviation amount and/or the position of the thick portion or thin portion, according to a method suited to each k-th-order thickness deviation.

A manufacturing apparatus according to the twelfth invention is characterized in that the first calculating means calculates a real part R(k) and an imaginary part I(k) of the complex Fourier component of each k-th-order thickness deviation by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, and the second calculating means calculates a thickness deviation amount G(k) of each k-th-order thickness deviation by $$G(k) = 4\sqrt{R(k)^2 + I(k)^2}.$$

A manufacturing apparatus according to the thirteenth invention is characterized in that the third calculating means calculates a position argW(k) of the thick portion or a position argN(k) of the thin portion of each k-th-order thickness deviation with a unit of angle in which the position of a first measurement point is 0°, using the real part R(k) and imaginary part I(k) of the complex Fourier component of each k-th-order thickness deviation, by $$\arg W(k) = \frac{1}{k}\left(\tan^{-1}\frac{I(k)}{R(k)}\right)\frac{180}{\pi},$$

or $$\arg N(k) = \frac{1}{k}\left(\tan^{-1}\frac{I(k)}{R(k)}+\pi\right)\frac{180}{\pi}.$$

A manufacturing apparatus according to the fourteenth invention is an apparatus for manufacturing seamless pipes while adjusting wall thickness based on measured values of wall thickness of a pipe, and characterized by comprising: means for measuring the wall thickness at a plurality of points in a circumferential direction in a plurality of cross sections of the pipe in an axial direction; first calculating means for calculating a complex Fourier component of a first-order thickness deviation of the wall thickness that changes periodically once in one turn by performing a complex Fourier transform in the circumferential direction on a plurality of measured values of the wall thickness in the plurality of the cross sections in the axial direction; second calculating means for calculating a thickness deviation amount indicating a degree of thickness deviation of the first-order thickness deviation, from an absolute value of the calculated complex Fourier component, for the plurality of the cross sections in the axial direction; third calculating means for calculating a phase of the first-order thickness deviation, from the calculated complex Fourier component, for the plurality of the cross sections in the axial direction; fourth calculating means for calculating a complex Fourier component for each frequency representing the number of times the thickness deviation is twisted per unit length in a longitudinal direction of the pipe, by taking a relationship between the thickness deviation amount and the phase thus calculated as a function of position in the longitudinal direction of the pipe and performing a complex Fourier transform over a plurality of the functions; determining means for determining whether values of the complex Fourier component in a plurality of predetermined frequency ranges are larger or not based on a predetermined boundary value; and adjusting means for adjusting manufacturing conditions of the pipe, when it is determined that the value of the complex Fourier component is larger in any of the frequency ranges, according to a method suited to the frequency range.

A manufacturing apparatus according to the fifteenth invention is characterized in that the first calculating means calculates a real part R(1) and an imaginary part I(1) of the complex Fourier component of the first-order thickness deviation by $$R(1) = \frac{1}{N}\sum_{i=1}^{N}\left\{WT(i)\cos\left(\frac{2\pi}{N}(i-1)\right)\right\},$$

and $$I(1) = \frac{1}{N}\sum_{i=1}^{N}\left\{WT(i)\sin\left(\frac{2\pi}{N}1(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, the second calculating means calculates a thickness deviation amount r of the first-order thickness deviation by $$r = 4\sqrt{R(1)^2 + I(1)^2},$$

the third calculating means calculates a phase θ of the first-order thickness deviation by $$\theta = \tan^{-1}\{I(1)/R(1)\},$$

and the fourth calculating means performs a complex Fourier transform on a function of y, f(y)=r(y)·exp(j·θ(y)), where j is an imaginary number, y is a length in the longitudinal direction of the pipe, and the r and θ are functions of y.

A thickness deviation information derivation apparatus according to the sixteenth invention is an apparatus for deriving information about a thickness deviation that occurs in a pipe, based on measured values of wall thickness of the pipe, and characterized by comprising: first calculating means for calculating a complex Fourier component of each k-th-order thickness deviation of the wall thickness that changes periodically k times (k is a natural number) in one turn by performing a complex Fourier transform in a circumferential direction on measured values of the wall thickness at a plurality of points in a cross section of the pipe in an axial direction; second calculating means for calculating a thickness deviation amount indicating a degree of thickness deviation of each k-th-order thickness deviation, from an absolute value of the calculated complex Fourier component; and third calculating means for calculating a position of a thick portion or thin portion of each k-th-order thickness deviation, from a phase of the calculated complex Fourier component.

A thickness deviation information derivation apparatus according to the seventeenth invention is characterized in that the first calculating means calculates a real part R(k) and an imaginary part I(k) of the complex Fourier component of each k-th-order thickness deviation by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, and the second calculating means calculates a thickness deviation amount G(k) of each k-th-order thickness deviation by $$G(k) = 4\sqrt{R(k)^2 + I(k)^2}.$$

A thickness deviation information derivation apparatus according to the eighteenth invention is characterized in that the third calculating means calculates a position argW(k) of the thick portion or a position argN(k) of the thin portion of each k-th-order thickness deviation with a unit of angle in which the position of a first measurement point is 0°, using the real part R(k) and imaginary part I(k) of the complex Fourier component of each k-th-order thickness deviation, by $$\text{argW}(k) = \frac{1}{k}\left(\tan^{-1}\frac{I(k)}{R(k)}\right)\frac{180}{\pi},$$

or $$\text{argN}(k) = \frac{1}{k}\left(\tan^{-1}\frac{I(k)}{R(k)} + \pi\right)\frac{180}{\pi}.$$

A thickness deviation information derivation apparatus according to the nineteenth invention is an apparatus for deriving information about a thickness deviation that occurs in a pipe, based on measured values of wall thickness of the pipe, and characterized by comprising: first calculating means for calculating a complex Fourier component of a first-order thickness deviation of the wall thickness that changes periodically once in one turn by performing a complex Fourier transform in a circumferential direction on measured values of the wall thickness at a plurality of points in a plurality of cross sections of the pipe in an axial direction; second calculating means for calculating a thickness deviation amount indicating a degree of thickness deviation of the first-order thickness deviation, from an absolute value of the calculated complex Fourier component, for the plurality of the cross sections in the axial direction; third calculating means for calculating a phase of the first-order thickness deviation, from the calculated complex Fourier component, for the plurality of the cross sections in the axial direction; fourth calculating means for calculating a complex Fourier component for each frequency representing the number of times the thickness deviation is twisted per unit length in a longitudinal direction of the pipe, by performing a complex Fourier transform on a complex function in which a complex number whose absolute value and phase are the thickness deviation amount and the phase thus calculated, respectively, is a function of position in the longitudinal direction of the pipe; and determining means for determining whether the values of the complex Fourier component in a plurality of predetermined frequency ranges are larger or not based on a predetermined boundary value.

A thickness deviation information derivation apparatus according to the twentieth invention is characterized in that the first calculating means calculates a real part R(1) and an imaginary part I(1) of the complex Fourier component of the first-order thickness deviation by $$R(1) = \frac{1}{N}\sum_{i=1}^{N}\left\{WT(i)\cos\left(\frac{2\pi}{N}(i-1)\right)\right\},$$

and $$I(1) = \frac{1}{N}\sum_{i=1}^{N}\left\{WT(i)\sin\left(\frac{2\pi}{N}1(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, the second calculating means calculates a thickness deviation amount r of the first-order thickness deviation by $$r = 4\sqrt{R(1)^2 + I(1)^2},$$

the third calculating means calculates a phase θ of the first-order thickness deviation by $$\theta = \tan^{-1}\{I(1)/R(1)\},$$

and the fourth calculating means performs a complex Fourier transform on a function of y, $f(y) = r(y) \cdot \exp(j \cdot \theta(y))$, where j is an imaginary number, y is a length in the longitudinal direction of the pipe, and the r and θ are functions of y.

A computer program according to the twenty first invention is a computer program for causing a computer to derive information about a thickness deviation that occurs in a pipe, based on wall thickness values of the pipe, and characterized by comprising: a first calculation step of causing a computer to calculate a complex Fourier component of each k-th-order thickness deviation of the wall thickness that changes periodically k times (k is a natural number) by performing a complex Fourier transform on a series of the wall thickness values of the pipe; a second calculation step of causing a computer to calculate a thickness deviation amount indicating a degree of thickness deviation of each k-th-order thickness deviation, from an absolute value of the calculated complex Fourier component; and a third calculation step of causing a computer to calculate a position of a thick portion or thin portion of each k-th-order thickness deviation, from a phase of the calculated complex Fourier component.

A computer program according to the twenty second invention is characterized in that the first calculation step includes a step of causing a computer to calculate a real part R(k) and an imaginary part I(k) of the complex Fourier component of each k-th-order thickness deviation by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of the wall thickness values, and WT(i) is the i-th wall thickness value, and the second calculation step includes a step of causing a computer to calculate a thickness deviation amount G(k) of each k-th-order thickness deviation by $$G(k)=4\sqrt{R(k)^2+I(k)^2}.$$

A computer program according to the twenty third invention is characterized in that the third calculation step includes a step of causing a computer to calculate a position argW(k) of the thick portion or a position argN(k) of the thin portion of each k-th-order thickness deviation with a unit of angle, using the real part R(k) and imaginary part I(k) of the complex Fourier component of each k-th-order thickness deviation, by $$\text{arg}W(k) = \frac{1}{k}\left(\tan^{-1}\frac{I(k)}{R(k)}\right)\frac{180}{\pi},$$

or $$\text{arg}N(k) = \frac{1}{k}\left(\tan^{-1}\frac{I(k)}{R(k)} + \pi\right)\frac{180}{\pi}.$$

A computer program according to the twenty fourth invention is a computer program for causing a computer to derive information about a thickness deviation that occurs in a pipe, based on wall thickness values of the pipe, and characterized by comprising: a first calculation step of causing a computer to calculate a complex Fourier component of a first-order thickness deviation of the wall thickness that changes periodically once by performing a complex Fourier transform on each of a plurality of series of the wall thickness values; a second calculation step of causing a computer to calculate a thickness deviation amount indicating a degree of thickness deviation of the first-order thickness deviation, from an absolute value of the calculated complex Fourier component, for each of a plurality of series of the wall thickness values; a third calculation step of causing a computer to calculate a phase of the first-order thickness deviation, from the calculated complex Fourier component, for each of a plurality of series of the wall thickness values; a fourth calculation step of causing a computer to calculate a complex Fourier component for each frequency by performing a complex Fourier transform on a relationship between the thickness deviation amount and the phase calculated for each of a plurality of series of the wall thickness values, over a plurality of series of the wall thickness values; and a step of causing a computer to determine whether values of the complex Fourier component in a plurality of predetermined frequency ranges are larger or not based on a predetermined boundary value.

A computer program according to the twenty fifth invention is characterized in that the first calculation step includes a step of causing a computer to calculate a real part R(1) and an imaginary part I(1) of the complex Fourier component of the first-order thickness deviation by $$R(1) = \frac{1}{N}\sum_{i=1}^{N}\left\{WT(i)\cos\left(\frac{2\pi}{N}(i-1)\right)\right\},$$

and $$I(1) = \frac{1}{N}\sum_{i=1}^{N}\left\{WT(i)\sin\left(\frac{2\pi}{N}1(i-1)\right)\right\}$$

where N is the number of the wall thickness values included in a series of the wall thickness values, and WT(i) is the i-th wall thickness value included in the series of the wall thickness values, the second calculation step includes a step of causing a computer to calculate a thickness deviation amount r of the first-order thickness deviation by $$r=4\sqrt{R(1)^2+I(1)^2},$$

the third calculation step includes a step of causing a computer to calculate a phase θ of the first-order thickness deviation by $$\theta=\tan^{-1}\{I(1)/R(1)\},$$

and the fourth calculation step includes a step of causing a computer to perform complex Fourier transform on a function of y, f(y)=r(y)·exp(j·θ(y)), where j is an imaginary number, y is a length in a longitudinal direction of the pipe, and the r and θ are functions of y.

In the first, eleventh, sixteenth, and twenty first invention, a complex Fourier transform is performed on measured values of the wall thickness at a plurality of points in a cross section of a seamless pipe in the axial direction, the type of thickness deviation is classified, a thickness deviation amount is calculated from the absolute value of a complex Fourier component, the position of a thick portion or thin portion of the thickness deviation is calculated from the phase of the complex Fourier component, and manufacturing conditions of the pipe are adjusted based on the type of thickness deviation, the thickness deviation amount, and the position of the thick portion or thin portion. Since the absolute value of the complex Fourier component gives the amplitude of each k-th-order thickness deviation of the wall thickness that changes periodically k times in one turn, the thickness deviation amount of each k-th-order thickness deviation is obtained. Further, since the phase given by the ratio between the real part and the imaginary part of the complex Fourier component indicates the degree of deviation of a curve drawn from the measurement start point as the origin by plotting the angle in the circumferential direction of the pipe on the abscissa and the change of the k-th-order thickness deviation on the ordinate, from a cosine curve composed only of the real part, the position of the thick portion where the curve has a maximum value and the position of the thin portion where the curve has a minimum value are obtained from the phase. Consequently, the type of thickness deviation, the thickness deviation amount, and the position of the thick portion or thin portion are found, and an appropriate action to prevent the thickness deviation is taken.

In the second, twelfth, seventeenth, and twenty second invention, when the thickness deviation amount of each k-th-order thickness deviation is defined as the value obtained by subtracting the minimum wall thickness from the maximum wall thickness, then the thickness deviation amount is $4\sqrt{R(k)^2+I(k)^2}$ which is twice the amplitude $2\sqrt{R(k)^2+I(k)^2}$ of a sine wave drawn by each k-th-order thickness deviation, and, since the thickness deviation amount of each k-th-order thickness deviation is calculated, an adjustment amount for adjusting the wall thickness of the pipe to prevent the thickness deviation is determined.

In the third, thirteenth, eighteenth, and twenty third invention, the position of the thick portion of each k-th-order thickness deviation is the position of an angle obtained by dividing the phase given by the ratio between the real part and the imaginary part of the complex Fourier component by k, and the position of the thin portion is the position of an angle obtained by dividing, by k, the value obtained by adding two right angles to the phase indicating the position of the thick portion within one cycle, and, since the position of the thick portion or thin portion of each k-th-order thickness deviation is calculated, a position where the wall thickness of the pipe is to be adjusted to prevent the thickness deviation and whether the adjustment amount is positive or negative are specified.

In the fourth invention, when a second-order thickness deviation occurs, the manufacturing conditions of the pipe are adjusted to eliminate the cause of the second-order thickness deviation. The second-order thickness deviation is caused by a variation of pressure during rolling by the mandrel mill, and therefore, when the second-order thickness deviation occurs, the distance between the rolling rolls of a rolling roll pair rolling the position of the thick portion is decreased according to the deviation amount, and the distance between the rolling rolls of a rolling pair rolling the position of the thin portion is increased according to the thickness deviation amount.

In the fifth invention, when a fourth-order thickness deviation occurs, the manufacturing conditions of the pipe are adjusted to eliminate the cause of the fourth-order thickness deviation. For the fourth-order thickness deviation, the present inventors found out that the thickness deviation amount can be changed by changing the shape of the mandrel bar, and therefore, when the fourth-order thickness deviation occurs, the mandrel bar is replaced by a bar having a different diameter according to the thickness deviation amount.

In the sixth invention, when a third-order thickness deviation and a sixth-order thickness deviation occur, the manufacturing conditions of the pipe are adjusted to eliminate the cause of the thickness deviations. For the third-order thickness deviation and sixth-order thickness deviation, the present inventors found out that the thickness deviation amount can be reduced by adjusting the shape of the groove of the reducing rolling mill that is a reducing mill or a sizing mill, and therefore, when the third-order thickness deviation and sixth-order thickness deviation occur, the rolls are replaced according to the thickness deviation amount and the position of the thick portion or thin portion.

In the seventh invention, the relationship between the thickness deviation amount and the phase of each k-th-order thickness deviation obtained for a plurality of cross sections in the axial direction is taken as a function of the longitudinal direction of the pipe, a complex Fourier transform is performed on the function, the thickness deviation is further classified by the frequency of twist of the thickness deviation, and an appropriate action is taken to prevent the thickness deviation according to the classified thickness deviation.

In the eighth, fourteenth, nineteenth, and twenty fourth invention, the relationship between the thickness deviation amount and phase of a first-order thickness deviation obtained for a plurality of cross sections in the axial direction is taken as a function of the longitudinal direction of the pipe, a complex Fourier transform is performed on the function, the thickness deviation is further classified by the frequency of twist of the thickness deviation, and an appropriate action is taken to prevent the thickness deviation according to the classified thickness deviation.

In the ninth, fifteenth, twentieth, and twenty fifth invention, for the thickness deviation amount r and phase $\theta$ of a first-order thickness deviation obtained for a plurality of cross sections in the axial direction, a complex Fourier transform is performed on a function of y, $f(y)=r(y)\cdot\exp(j\cdot\theta(y))$, where j is an imaginary number, y is a length in the longitudinal direction of the pipe, and the r and $\theta$ are functions of y. When m is the frequency of twist and $\alpha m$ is an angular frequency corresponding to the frequency m of twist, then the frequency m of twist of the first-order thickness deviation is analyzed by a result of complex Fourier transform corresponding to a component of $\exp(j(\alpha m \cdot y))$, and an appropriate action is taken to prevent a thickness deviation according to the thickness deviation classified by the frequency.

In the tenth invention, when a first-order thickness deviation with a large frequency of twist occurs, and when a first-order thickness deviation with a small frequency of twist occurs, the manufacturing conditions of the pipe are adjusted to eliminate the causes of the respective thickness deviations. When the frequency of twist is small, i.e., when the first-order thickness deviation is twisted over a long length in the longitudinal direction of the pipe, the cause of the thickness deviation is a variation of heating in the heating furnace, and therefore the temperature of heating the billet is increased by increasing the heating time or by increasing the temperature in the heating furnace. When the frequency of twist is large, i.e., when the first-order thickness deviation is twisted in a short length in the longitudinal direction of the pipe, the cause of the thickness deviation is misalignment between the central axis of a tool used for piercing and the central axis of the billet, and therefore the part that causes eccentricity is replaced.

The above and further objects and features of the invention will more fully be apparent from the following detailed description with accompanying drawings.

BRIEF DESCRIPTION OF THE DRAWINGS

FIG. 6 is a schematic cross sectional view in the axial direction, showing an example of the configuration of a wall thickness meter;

FIG. 10 is a table showing an example of the result of application of the present invention.

DETAILED DESCRIPTION OF THE PRESENT INVENTION

The following description will specifically explain the present invention, based on the drawings illustrating some embodiments thereof.

Figures 1A, 1B:
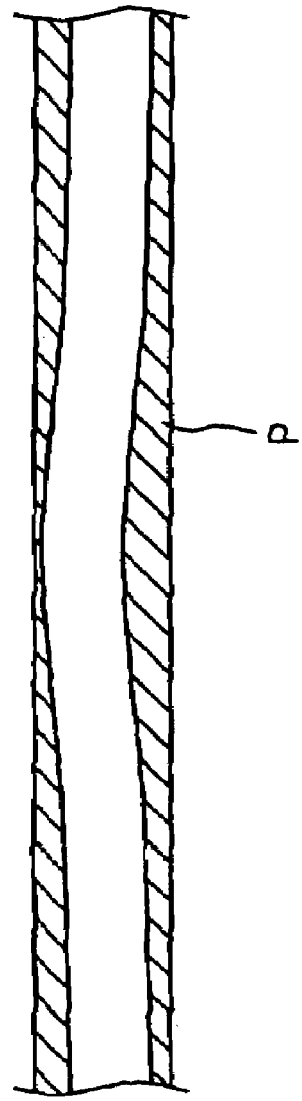
FIG. 1A and FIG. 1B are cross sectional views of a seamless pipe with various types of thickness deviations.
Figure 2:
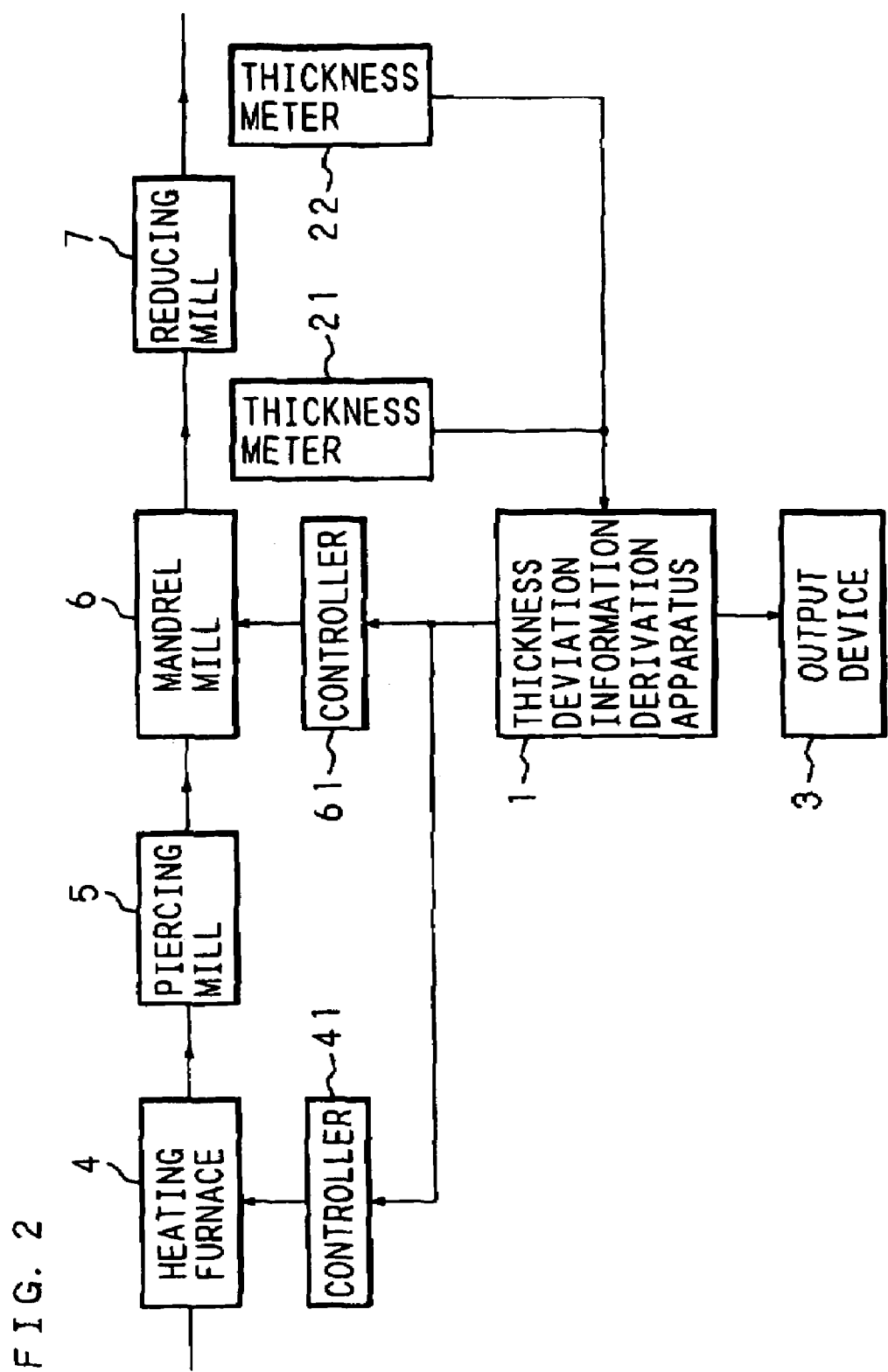
FIG. 2 is a block diagram showing a manufacturing apparatus of seamless pipe of the present invention.

FIG. 2 is a block diagram showing a manufacturing apparatus of seamless pipes of the present invention. A seamless pipe is manufactured by the process of heating a billet to a required temperature in a heating furnace 4, piercing and rolling the billet by a piercing mill 5 to obtain a hollow shell, elongating and rolling the hollow shell using a mandrel mill 6, and performing sizing rolling using a reducing mill for adjusting the shape, such as the external diameter and wall thickness. The manufacturing apparatus of the present invention comprises: a wall thickness meter 21 provided on the exit side of the mandrel mill 6; a wall thickness meter 22 provided on the exit side of the reducing mill 7; a thickness deviation information derivation apparatus 1 to which the wall thickness meters 21 and 22 are connected; an output device 3, connected to the thickness deviation information derivation apparatus 1, for outputting information from the thickness deviation information derivation apparatus 1; a controller 41, connected to the thickness deviation information derivation apparatus 1, for controlling the heating furnace 4 based on the information from the thickness deviation information derivation apparatus 1; and a controller 61, connected to the thickness deviation information derivation apparatus 1, for controlling the mandrel mill 6 based on the information from the thickness deviation information derivation apparatus 1.

Figure 3:
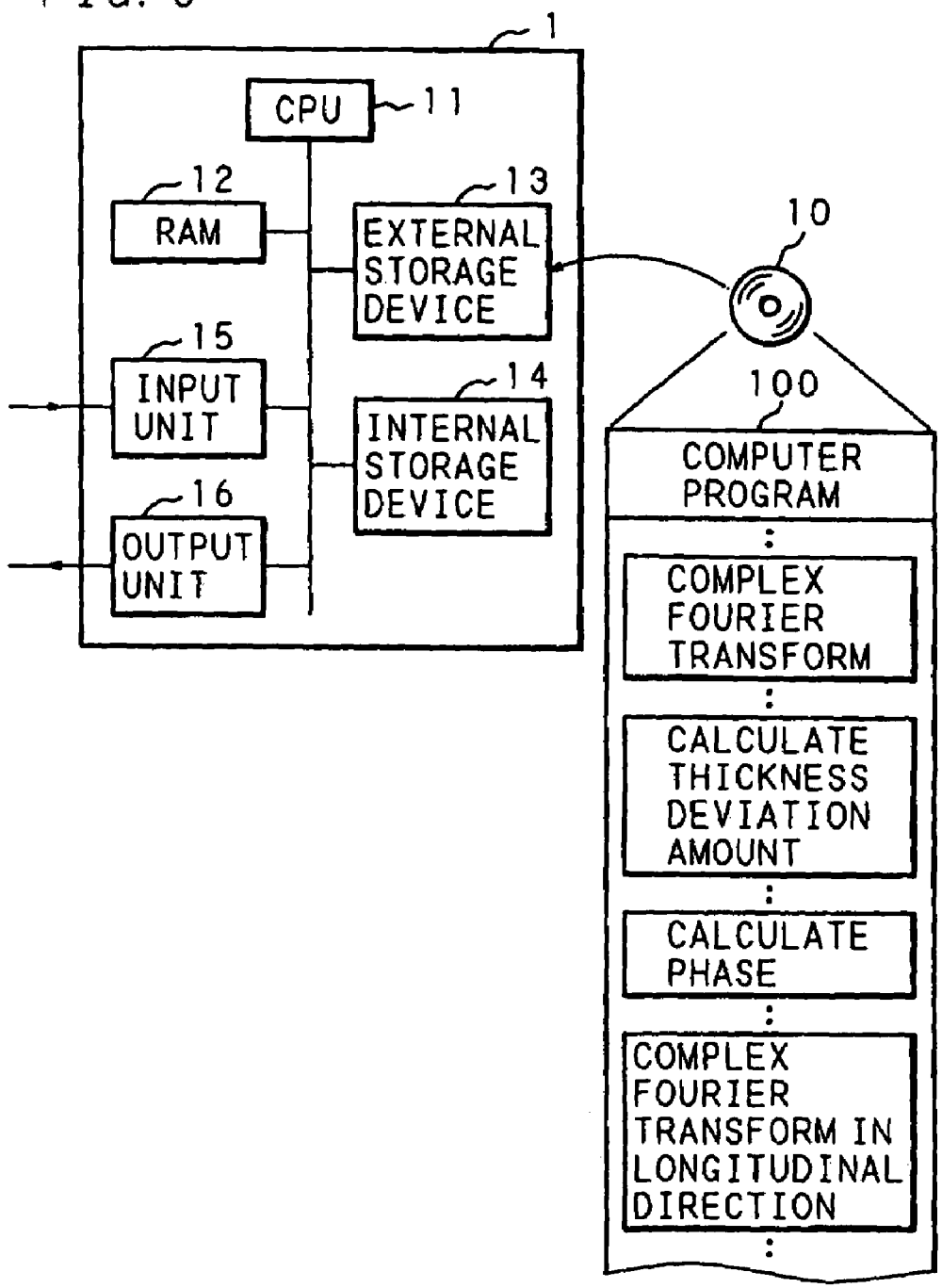
FIG. 3 is a block diagram showing the configuration of a thickness deviation information derivation apparatus of the present invention.

FIG. 3 is a block diagram showing the configuration of the thickness deviation information derivation apparatus 1 of the present invention. The thickness deviation information derivation apparatus 1 is constructed using a computer, comprises: a CPU 11 for performing operations; a RAM 12 for storing temporary information generated by the operations; an external storage device 13 such as a CD-ROM drive; and an internal storage device 14 such as a hard disk or a semiconductor memory, reads a computer program 100 of the present invention from a memory product 10 such as a CD-ROM by the external storage device 13, stores the read computer program 100 into the internal storage device 14, loads the computer program 100 into the RAM 12, and executes processing necessary for the thickness deviation information derivation apparatus 1, based on the loaded computer program 100. The thickness deviation information derivation apparatus 1 comprises an input unit 15 connected to the wall thickness meters 21 and 22, and receives information from the wall thickness meters 21 and 22 through the input unit 15. Moreover, the thickness information derivation apparatus 1 comprises an output unit 16 connected to the output device 3 and the controllers 41 and 61, and outputs information to the output device 3 and the controllers 41 and 61 through the output unit 16.

Figure 4:
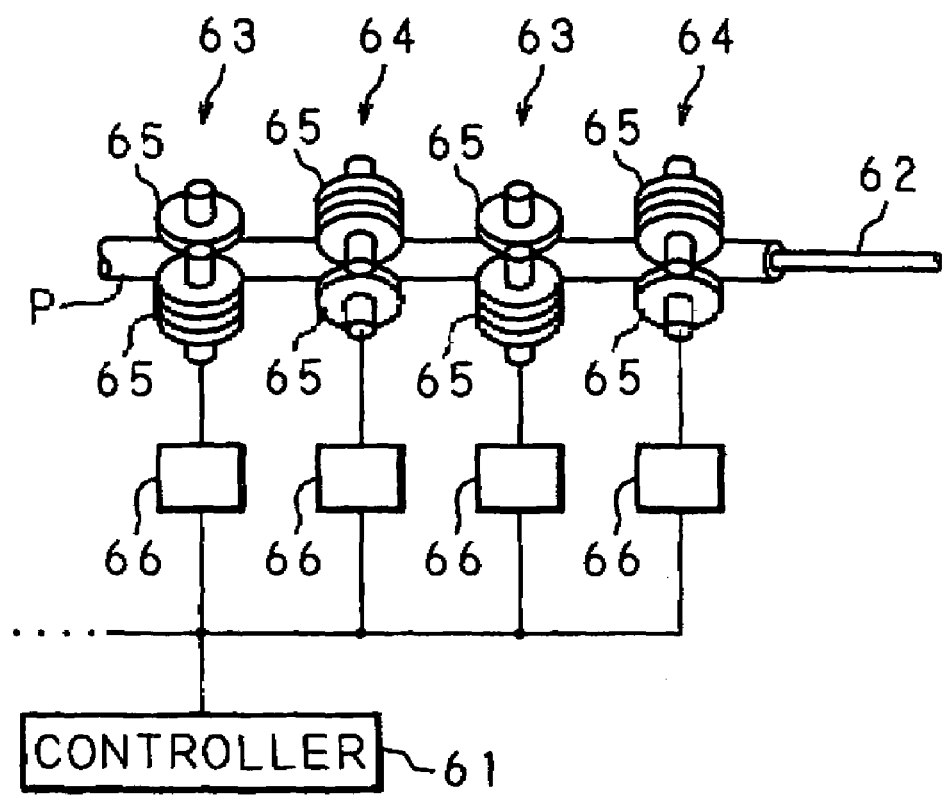
FIG. 4 is a schematic view showing the configuration of a mandrel mill.

FIG. 4 is a schematic view showing the configuration of the mandrel mill 6. The mandrel mill 6 comprises: a first stand 63 including a pair of rolling rolls 65, 65 for rolling a pipe P from the right and left sides and a second stand 64 including a pair of rolling rollers 65, 65 for rolling the pipe P from the upper and lower sides, which are arranged alternately; and a mandrel bar 62 to be inserted into the pipe P, and rolls the pipe P into which the mandrel bar 62 is inserted, from the upper, lower, right and left sides. Each of the first stands 63, 63, . . . and the second stands 64, 64, . . . has a rolling adjuster 66 for adjusting the distance between a pair of rolling rolls 65, 65, and each of the rolling adjusters 66, 66, . . . is connected to the controller 61. The rolling adjusters 66, 66, . . . are controlled by the controller 61, and adjust the distance between the rolling rolls 65 and 65.

Figure 5A:
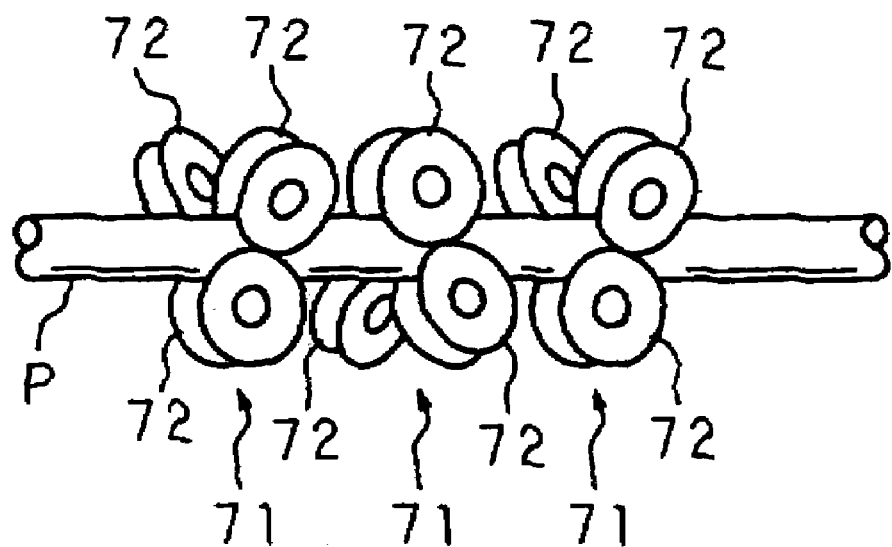
FIG. 5A and FIG. 5B are schematic views showing the configuration of a reducing mill.
Figure 5B:
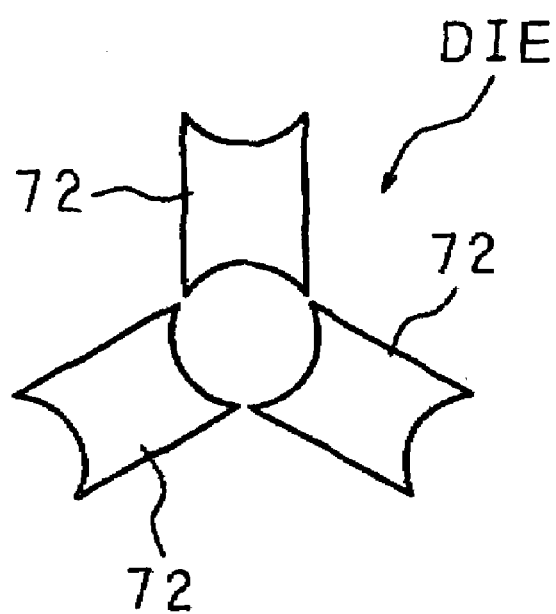

FIG. 5A and FIG. 5B are schematic views showing the configuration of the reducing mill 7. FIG. 5A is a perspective view of the reducing mill 7. The reducing mill 7 comprises stands 71, 71, . . . along a longitudinal direction of the pipe P, and each stand 71 has a set of three bobbin-like rolls 72, 72, 72. FIG. 5B is a front view of the stand 71. A die is formed by a set of three rolls 72, 72, 72, and the reducing mill 7 adjusts the shape of the pipe P by inserting the pipe P into the grooves and sizing the pipe P.

FIG. 6 is a schematic cross sectional view in the axial direction, showing an example of the configuration of the wall thickness meter 21. In FIG. 6, the structure of an example of measuring the wall thickness of the pipe P at 9 points on the periphery of the pipe P by using radiation is illustrated, and 211*a* through 219*a* in FIG. 6 are radiation sources, and 211*b* through 219*b* in FIG. 6 are radiation detectors. Radiation from the radiation source 211*a* is detected by the radiation detector 211*b*, radiation from the radiation source 212*a* is detected by the radiation detector 212*b*, and detection of radiation is carried out in the same manner by the other radiation detectors. The length that the radiation passed through the pipe P is measured from the attenuation of radiation detected by the radiation detector. The point of 211 shown in FIG. 6 is measured by the radiation source 211*a* and the radiation detector 211*b*, and the radiation source 215*a* and the radiation detector 215*b*, and each of other points is also measured twice in the same manner. Moreover, the length obtained by the sum of the wall thicknesses at the point of 211 and the point of 216 shown in FIG. 6 is measured from the radiation detected by the radiation detector 211*b*, and similarly the length obtained by the sum of the wall thicknesses at two points is also measured for each of the other radiation detectors. By solving a simultaneous equation where the sum of the wall thicknesses at two points is equal to a length measured by each radiation detector, the wall thicknesses at the points 211 through 219 are measured. The wall thickness meter 22 also has the same configuration.

Figure 7:
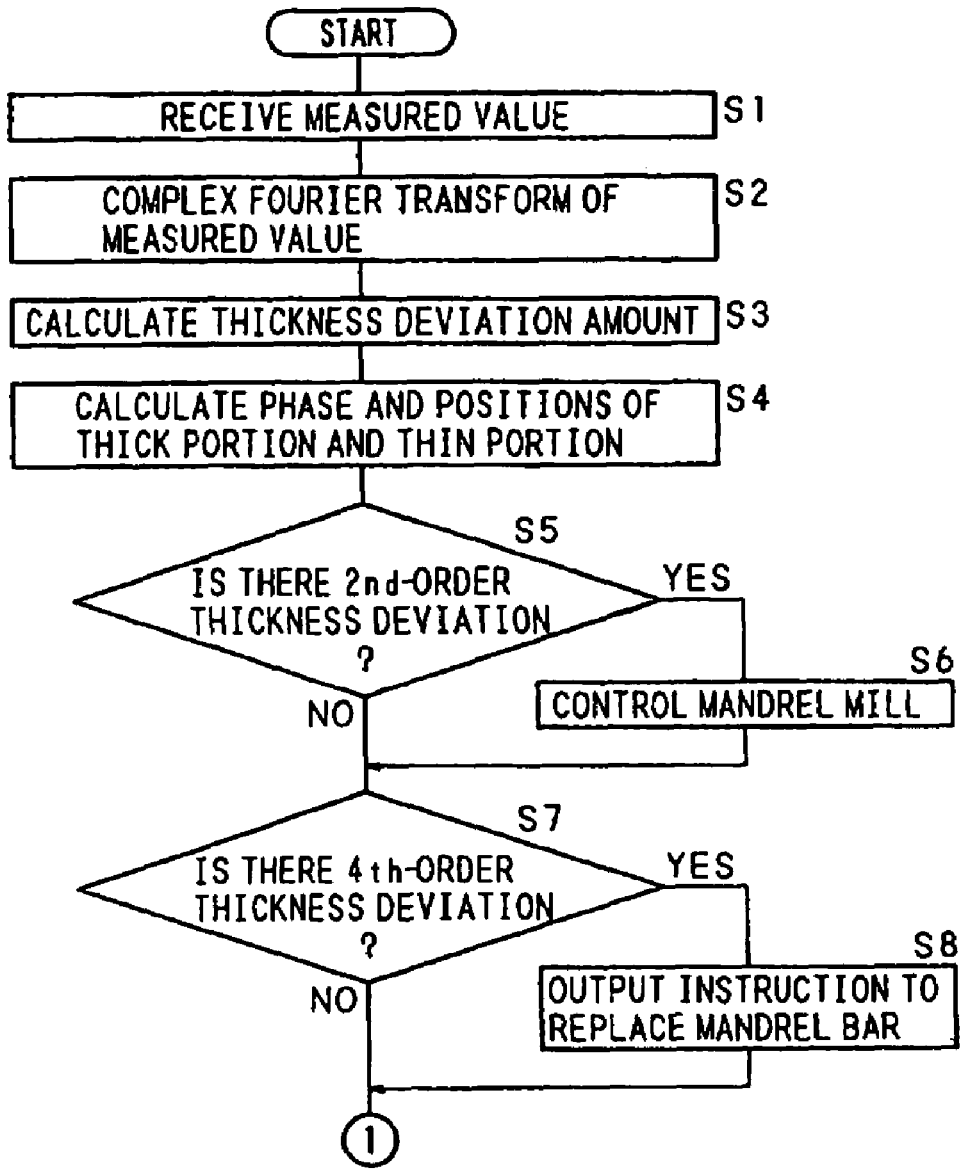
FIG. 7 is a flowchart showing the procedure of the process performed by the thickness deviation information derivation apparatus of the present invention.
Figure 8:
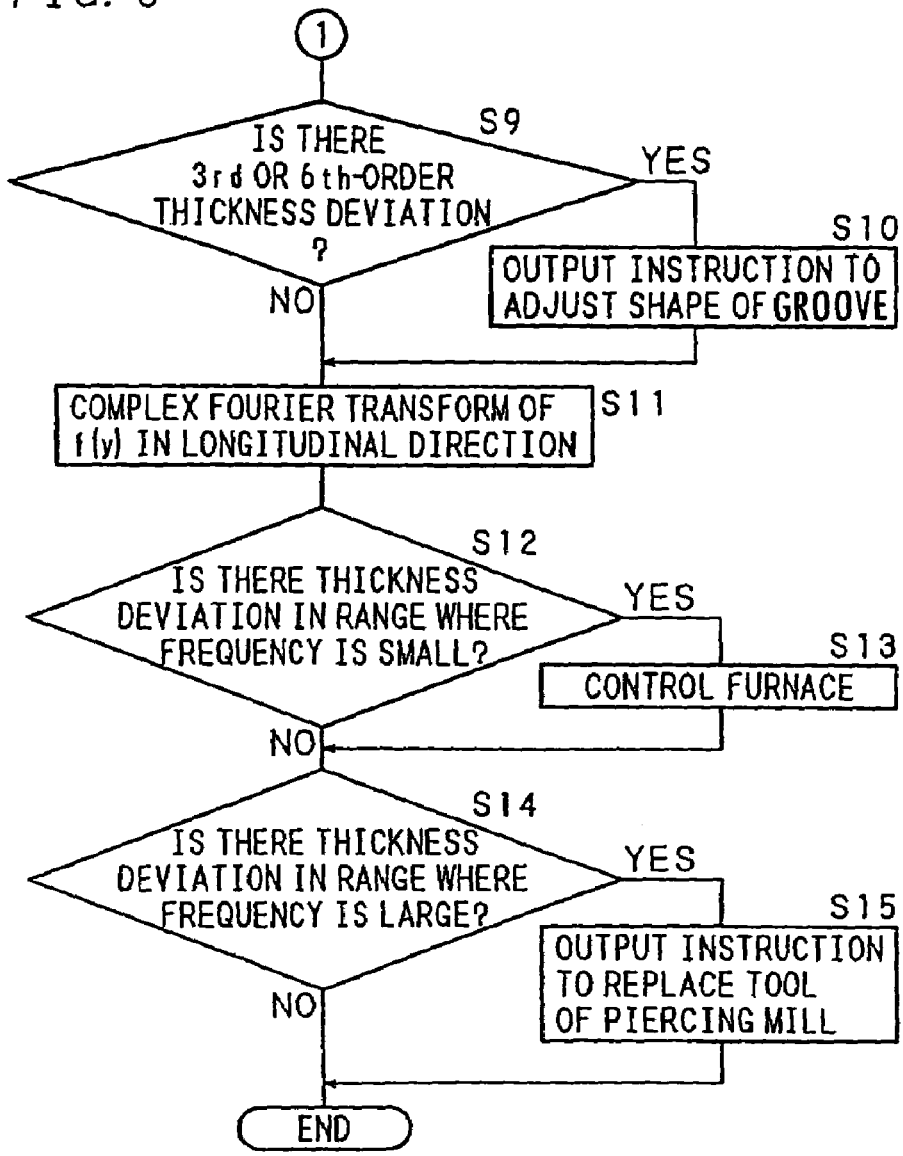
FIG. 8 is a flowchart showing the procedure of the process performed by the thickness deviation information derivation apparatus of the present invention.

Next, referring to the flowchart, the following description will explain a manufacturing method of seamless pipes of the present invention. FIG. 7 and FIG. 8 are a flowchart showing the procedure of the process performed by the thickness deviation information derivation apparatus 1 of the present invention. The wall thickness meters 21 and 22 measure the wall thickness of a pipe P to be manufactured, at a plurality of points in the cross section in the axial direction at a constant pitch in the longitudinal direction, and input the measured values of wall thickness to the thickness deviation information derivation apparatus 1. The thickness deviation information derivation apparatus 1 receives the measured values of wall thickness from the wall thickness meters 21 and 22 at the input unit 15 (S1), and the CPU 11 of the thickness deviation information derivation apparatus 1 loads the computer program 100 into the RAM 12, performs a complex Fourier transform on the received measured values and calculates a complex Fourier component of each k-th-order thickness deviation of wall thickness that changes periodically k times in one turn, according to the loaded computer program 100 (S2). Here, by representing the number of measurement points at which the wall thickness is measured in the cross section by N and representing the measured value of the wall thickness at the i-th measurement point among measurement points aligned in a circumferential direction of the cross section by WT(i), a real part R (k) and an imaginary part I(k) of the complex Fourier component of each k-th-order thickness deviation are calculated from the discretely obtained WT(i) by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

Next, according to the computer program 100 loaded into the RAM 12, the CPU 11 calculates a thickness deviation amount G(k) of each k-th-order thickness deviation (S3) by $$G(k)=4\sqrt{R(k)^2+I(k)^2}.$$

When the thickness deviation amount G(k) is defined as the value obtained by subtracting the minimum wall thickness from the maximum wall thickness, then the thickness deviation amount G(k) is $4\sqrt{R(k)^2+I(k)^2}$, which is twice the amplitude $2\sqrt{R(k)^2+I(k)^2}$ of a sine wave drawn by each k-th-order thickness deviation.

Next, according to the computer program 100 loaded into the RAM 12, the CPU 11 calculates the phase of the complex Fourier component of each k-th-order thickness deviation and the positions of a thick portion and a thin portion (S4). A phase θ of the complex Fourier component is obtained from the ratio between the real part R(k) and the imaginary part I(k) of the complex Fourier component, and here the CPU 11 calculates the phase θ by θ=tan$^{-1}$ {I(k)/R(k)}. Moreover, since the phase θ indicates the degree of deviation of a curve drawn from the measurement start point i=1 as the origin by plotting the angle in the circumferential direction of the pipe P on the abscissa and the change of the k-th-order thickness deviation on the ordinate, from a cosine curve composed only of the real part, here the CPU 11 calculates one position argW(k) of thick portion where the above-mentioned curve has a maximum value, with a unit of angle in which the position of the measurement point i=1 is 0°, by $$\arg W(k) = \frac{1}{k}\left(\tan^{-1}\frac{I(k)}{R(k)}\right)\frac{180}{\pi}.$$

Moreover, the positions argW(k) of k thick portions of the k-th-order thickness deviation are given by $$\arg W(k) = \frac{1}{k}\left(\tan^{-1}\frac{I(k)}{R(k)} + 2(n-1)\pi\right)\frac{180}{\pi}$$

where n is a natural number, n=1, 2, . . . , k. Further, since the position of the thin portion is the position obtained by adding two right angles to the position of the thick portion within one cycle of change of the thickness deviation, here the CPU 11 calculates one position argN(k) of thin portion, or the positions argN(k) of k thin portions of the k-th-order thickness deviation as follows.

$$\arg N(k)\frac{1}{k}\left(\tan^{-1}\frac{I(k)}{R(k)} + \pi\right)\frac{180}{\pi},$$

or $$\arg N(k) = \frac{1}{k}\left(\tan^{-1}\frac{I(k)}{R(k)} + (2n-1)\pi\right)\frac{180}{\pi}$$

Next, according to the computer program 100 loaded into the RAM 12, the CPU 11 determines whether or not the calculated thickness deviation amount G(2) of a second-order thickness deviation exceeds a predetermined boundary value, i.e., whether or not there is a second-order thickness deviation exceeding the tolerance (S5). When there is a second-order thickness deviation (S5: YES), according to the computer program 100 loaded into the RAM 12, the CPU 11 outputs information for preventing the second-order thickness deviation to the controller 61 of the mandrel mill from the output unit 16, and controls the mandrel mill (S6). At this time, the thickness deviation information derivation apparatus 1 outputs information including the calculated thickness deviation amount G(2), the position argW(2) of the thick portion and the position argN(n) of the thin portion, and, according to the information outputted from the thickness deviation information derivation apparatus 1, the controller 61 controls the mandrel mill to prevent the second-order thickness deviation by causing the rolling adjuster 66 of a stand comprising a pair of rolling rolls 65, 65 rolling in the direction of the thick portion to decrease the distance between the rolling rolls 65 and 65, and causing the rolling adjuster 66 of a stand comprising a pair of rolling rolls 65, 65 rolling in the direction of the thin portion to increase the distance between the rolling rolls 65 and 65.

When step S6 is completed, and when there is no second-order thickness deviation in step S5 (S5: NO), according to the computer program 100 loaded into the RAM 12, the CPU 11 determines whether or not the calculated thickness deviation amount G(4) of a fourth-order thickness deviation exceeds a predetermined boundary value, i.e., whether or not there is a fourth-order thickness deviation exceeding the tolerance (S7), and, when there is a fourth-order thickness deviation (S7: YES), the CPU 11 outputs, from the output unit 16 to the output device 3, an instruction to replace the mandrel bar 61 of the mandrel mill 6 by a mandrel bar 61 having an appropriate diameter according to the thickness deviation amount (S8). The instruction to replace the mandrel bar 61 is outputted to the output device 3, and the mandrel bar 61 is replaced by another mandrel bar 61 having an appropriate diameter that can prevent the fourth-order thickness deviation by the work of an operator.

When step S8 is completed, and when there is no fourth-order thickness deviation in step S7 (S7: NO), according to the computer program 100 loaded into the RAM 12, the CPU 11 determines whether or not the calculated thickness deviation amount G(3) of a third-order thickness deviation or thickness deviation amount G(6) of a sixth-order thickness deviation exceeds a predetermined boundary value, i.e., whether or not there is a third-order thickness deviation or a sixth-order thickness deviation exceeding the tolerance (S9), and, when there is a third-order thickness deviation or a sixth-order thickness deviation (S9: YES), the CPU 11 outputs an instruction to adjust the shape of the groove of the reducing mill 7 to the output device 3 from the output unit 16 (S10). The instruction to adjust the shape of the die is outputted to the output device 3, and the rolls 72, . . . forming the die that causes the thickness deviation are replaced by new rolls 72, . . . according to the thickness deviation amount, the position of the thick portion and the position of the thin portion so as to prevent the third-order thickness deviation or the sixth-order thickness deviation.

Figure 9:
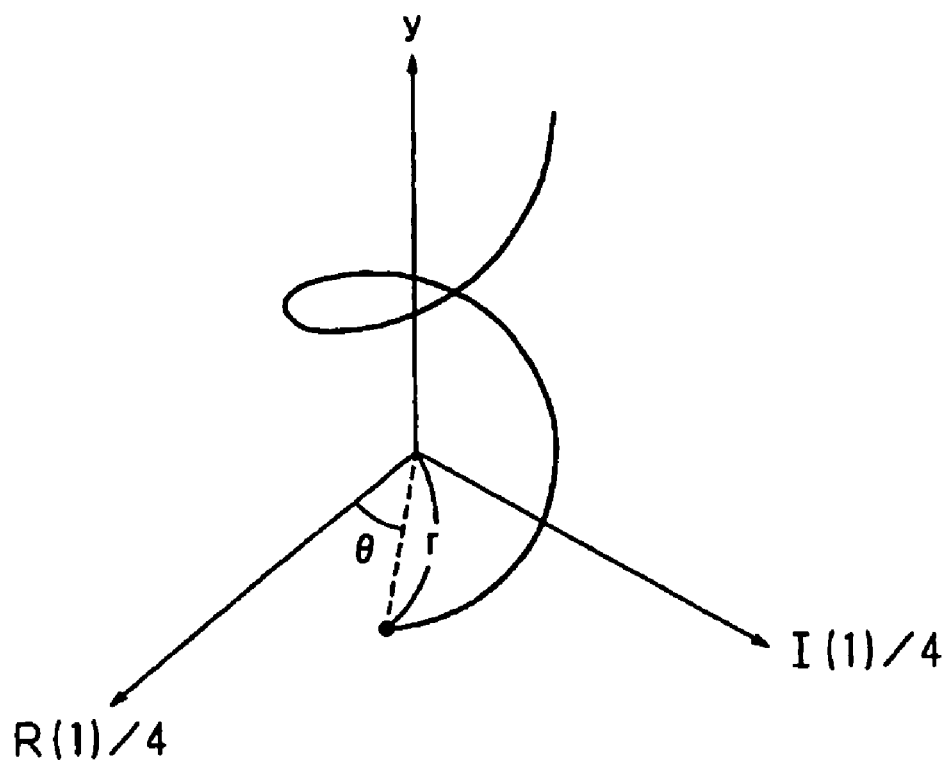
FIG. 9 is a characteristic view showing a complex function f(y)

When step S10 is completed, and when there is no third-order thickness deviation or sixth-order thickness deviation in step S9 (S9: NO), according to the computer program 100 loaded into the RAM 12, the CPU 11 performs, based on the thickness deviation amount G(1) of the first-order thickness deviation obtained for each cross section in the axial direction and the phase θ of the first-order thickness deviation, a complex Fourier transform in the y direction, namely, the longitudinal direction of the pipe, on a function of y, f(y)=r(y)·exp(j·θ(y)), where j is an imaginary number, y is a length in the longitudinal direction of the pipe, and the r and θ are functions of y, and calculates a complex Fourier component for each frequency m by supposing that m is a frequency of twist, αm is an angular frequency corresponding to the frequency m of twist, and θ=αm·y (S11). FIG. 9 is a characteristic view showing a complex function f(y). r(y)·exp(jθ) is represented as a point of polar coordinates with R(1)/4 as the abscissa and I(1)/4 as the ordinate, and, when the first-order thickness deviation is twisted in the longitudinal direction of the pipe, the complex function f(y) draws a substantially spiral trace by connecting the points of polar coordinates in the y direction. By performing the complex Fourier transform on f(y), it is possible to analyze the frequency m of twist of the first-order thickness deviation.

Next, according to the computer program 100 loaded into the RAM 12, the CPU 11 determines whether or not the absolute value of the complex Fourier component exceeds a predetermined boundary value in a range of not more than a predetermined frequency value m=m0, i.e., whether or not there is a twisted first-order thickness deviation in a range where the frequency m is small (S12), and, when there is such a first-order thickness deviation (S12: YES), the CPU 11 outputs information for preventing the first-order thickness deviation twisted over a long length in the longitudinal direction of the pipe P to the controller 41 of the heating furnace 4, and controls the heating furnace 4 (S13). At this time, the thickness deviation information derivation apparatus 1 outputs information including the absolute value of the calculated complex Fourier component, and the controller 41 increases the temperature of heating the billet by increasing the heating time of the billet in the heating furnace 4, or by adjusting the heating power to increase the temperature in the heating furnace 4, according to the information outputted from the thickness deviation information derivation apparatus 1, thereby reducing the occurrence of thickness deviation due to uneven heating.

When step S13 is completed, and when there is no twisted first-order thickness deviation in a range where the frequency m is small in step S12 (S12: NO), according to the computer program 100 loaded into the RAM 12, the CPU 11 determines whether or not the absolute value of the complex Fourier component exceeds a predetermined boundary value in a range exceeding a predetermined frequency value m=m0, i.e., whether or not there is a twisted first-order thickness in a range where the frequency m is large (S14), and, when there is such a first-order thickness deviation (S14: YES), the CPU 11 outputs an instruction to replace the tool that causes eccentricity in the piercing mill 5 to the output device 3 from the output unit 16 (S15). The instruction to replace the tool is outputted to the output device 3, and the tool causing eccentricity in the piercing mill 5 is replaced by the work of the operator to prevent the thickness deviation. When step S15 is completed, and when there is no twisted first-order thickness deviation in a range where the frequency m is large in step S14 (S14: NO), the CPU 11 completes the processing.

As described in detail above, in the present invention, the complex Fourier transform is performed on the measured values of wall thickness at a plurality of points in a cross section of the pipe in the axial direction, the thickness deviation amount and the positions of a thick portion and a thin portion are calculated from the calculated complex Fourier component for each k-th-order thickness deviation, the position of adjusting manufacturing conditions of the pipe to prevent a thickness deviation and whether the adjustment amount is positive or negative are specified in addition to the type of thickness deviation, and an appropriate action can be taken to prevent the thickness deviation. Furthermore, by performing the complex Fourier transform in the longitudinal direction of the pipe on the relationship between the thickness deviation amount and the phase, it is possible to classify the thickness deviation by the frequency of twist, and take an appropriate action to prevent the thickness deviation according to the cause of the thickness deviation.

Next, an example of the result of application of the present invention to the manufacturing process of seamless pipes is illustrated. FIG. 10 is a table showing the example of the result of application of the present invention. The contents of processes carried out are as follows.

(a) Replacing a tool in the piercing mill 5 when there is a twisted first-order thickness deviation in the range of large frequencies.

(b) Increasing the heating time in the heating furnace 4 when there is a twisted first-order thickness deviation in the range of small frequencies.

(c) Adjusting the mandrel mill 6 when there is a second-order thickness deviation.

(d) Replacing the mandrel bar 61 when there is a fourth-order thickness deviation.

(e) Replacing the rolls of the reducing mill 7 when there is a third-order thickness deviation or a sixth-order thickness deviation.

(f) Taking actions against thickness deviations by the method disclosed in Japanese Patent Application Laid-Open No. 61-135409 (1986).

(g) No action.

When the present invention was carried out according to the above-mentioned contents, the thickness deviation rate defined as thickness deviation rate=(thickness deviation amount/average thickness)×100 was calculated based on the data measured by the wall thickness meter 22, and the ratio of the number of seamless pipes with the thickness deviation rate equal to or more than 12.5% is shown in FIG. 10. As shown in FIG. 10, by using the present invention, the ratio of seamless pipes in which thickness deviations occurred is reduced compared to the case where no action was taken against thickness deviations. Furthermore, the ratio of seamless pipes in which thickness deviation occurred is reduced compared to prior arts, and thus it is clear that the present invention has a superior ability to reduce the occurrence of thickness deviations compared to the prior arts. Thus, with the present invention, it is possible to reduce the occurrence of various types of thickness deviations during the manufacture of seamless pipes and improve the quality of the seamless pipes.

Note that this embodiment illustrates a configuration in which the wall thickness meters 21 and 22 are provided on the exit side of the mandrel mill 6 and the exit side of the reducing mill 7, and the wall thickness meters 21 and 22 are connected to a common thickness deviation information derivation apparatus 1, but the present invention is not necessarily limited to this configuration and may be implemented in a configuration in which two thickness deviation information derivation apparatuses 1 are provided and the wall thickness meters 21 and 22 are individually connected to the respective thickness deviation information derivation apparatuses 1, or a configuration including only the wall thickness meter 22 on the exit side of the reducing mill 7 as the wall thickness meter.

Besides, this embodiment illustrates a configuration in which the thickness deviation information derivation apparatus 1 is constructed using a computer and performs processing related to the present invention according to the computer program 100, but the present invention is not limited to this configuration, and may be implemented in a configuration in which the thickness deviation information derivation apparatus 1 of the present invention is constructed by hardware for exclusive use, such as storing means for storing information from the wall thickness meter and converting means for performing a complex Fourier transform on measured values of wall thickness.

Moreover, although this embodiment illustrates a configuration using a method in which rolling is performed using a mandrel mill and the size is adjusted using the reducing mill during the manufacture of seamless pipes, the present invention is also applicable to a method of manufacturing seamless pipes by using rolling means other than a mandrel mill, such as a plug mill, and a reducing rolling mill other than a reducing mill, such as a sizing mill.

Furthermore, although this embodiment illustrates a method of analyzing the twist by performing a complex Fourier transform in the longitudinal direction only on the first-order thickness deviation, it may also be possible to use a method in which the complex Fourier transform is performed in the longitudinal direction on other k-th-order thickness deviations, the twist is analyzed, and actions are taken against the respective thickness deviations.

INDUSTRIAL APPLICABILITY

As described in detail above, in the present invention, it is possible to prevent a thickness deviation by performing a complex Fourier transform on measured values of wall thickness at a plurality of points in a cross section of a pipe in the axial direction, classifying the type of thickness deviation, calculating a thickness deviation amount from an absolute value of a complex Fourier component, calculating the position of a thick portion or thin portion of the thickness deviation, from the phase of the complex Fourier component, and adjusting manufacturing conditions of the pipe, based on the type of thickness deviation, the thickness deviation amount and the position of the thick portion or thin portion.

Moreover, in the present invention, an adjustment amount for adjusting the wall thickness of the pipe to prevent a thickness deviation is determined by calculating the thickness deviation amount of each k-th-order thickness deviation, and the wall thickness of the pipe can be appropriately adjusted to prevent the thickness deviation.

Furthermore, in the present invention, the position where the wall thickness of the pipe is to be adjusted to prevent a thickness deviation and whether the adjustment amount is positive or negative are specified by calculating the position of a thick portion or thin portion of each k-th-order thickness deviation, and the wall thickness of the pipe can be appropriately adjusted.

Additionally, in the present invention, when a second-order thickness deviation occurs, the rolling condition of the mandrel mill is adjusted according to the thickness deviation amount and the position of the thickness deviation, thereby reducing the occurrence of a second-order thickness deviation and improving the quality of the seamless pipe to be manufactured.

Further, in the present invention, when a fourth-order thickness deviation occurs, the mandrel bar is replaced by another bar of a different diameter according to the thickness deviation amount, thereby reducing the occurrence of a fourth-order thickness deviation and improving the quality of the seamless pipe to be manufactured.

Besides, in the present invention, when a third-order thickness deviation and a sixth-order thickness deviation occur, the rolls of the reducing rolling mill are replaced according to the thickness deviation amount and the position of the thickness deviation, thereby reducing the occurrence of a third-order thickness deviation and a sixth-order thickness deviation and improving the quality of the seamless pipe to be manufactured.

Moreover, in the present invention, the relationship between the thickness deviation amount and the phase of each k-th-order thickness deviation obtained for a plurality of cross sections in the axial direction is taken as a function of the longitudinal direction of the pipe, a complex Fourier transform is performed on the function, the thickness deviation is further classified by the frequency of twist of the thickness deviation, and the wall thickness of the pipe can be appropriately adjusted to prevent a thickness deviation, according to the classified thickness deviation.

Furthermore, in the present invention, the relationship between the thickness deviation amount and the phase of a first-order thickness deviation obtained for a plurality of cross sections in the axial direction is taken as a function of the longitudinal direction of the pipe, a complex Fourier transform is performed on the function, the thickness deviation is further classified by the frequency of twist of the thickness deviation, and the wall thickness of the pipe can be appropriately adjusted to prevent a thickness deviation, according to the classified thickness deviation.

Additionally, in the present invention, a function $r(y) \cdot \exp(j\theta)$ of thickness deviation amount r and phase $\theta$ of a first-order thickness deviation obtained for a plurality of cross sections in the axial direction is taken as a function of the longitudinal direction of the pipe, a complex Fourier transform is performed on the function, the frequency of twist of the first-order thickness deviation is analyzed, and the wall thickness of the pipe can be appropriately adjusted according to a thickness deviation classified by the frequency.

Besides, in the present invention, when a first-order thickness deviation with a small frequency of twist occurs, the heating temperature of the billet is increased, whereas when a first-order thickness deviation with a large frequency of twist occurs, the tool that causes eccentricity in the piercing mill is replaced, and consequently the present invention provides advantages effects such as reducing the occurrence of the respective first-order thickness deviations and improving the quality of the seamless pipe to be manufactured.

As this invention may be embodied in several forms without departing from the spirit of essential characteristics thereof, the present embodiments are therefore illustrative and not restrictive, since the scope of the invention is and all changes that fall within metes and bounds of the claims, or equivalence of such meters and bounds thereof are therefore intended to be embraced by the claims.

The invention claimed is:

1. A thickness deviation information derivation apparatus for deriving information about a thickness deviation that occurs in a pipe, based on measured values of wall thickness of the pipe, comprising:

first calculating means for calculating a complex Fourier component of each k-th-order thickness deviation of the wall thickness that changes periodically k times (k is a natural number) in one turn by performing a complex Fourier transform in a circumferential direction on measured values of the wall thickness at a plurality of points in a cross section of the pipe in an axial direction;

second calculating means for calculating a thickness deviation amount indicating a degree of thickness deviation of each k-th-order thickness deviation, from an absolute value of the calculated complex Fourier component; and third calculating means for calculating a position of a thick portion or thin portion of each k-th-order thickness deviation, from a phase of the calculated complex Fourier component.

2. The thickness deviation information derivation apparatus as set forth in claim 1, wherein the third calculating means calculates a position argW(k) of the thick portion or a position argN(k) of the thin portion of each k-th-order thickness deviation with a unit of angle in which the position of a first measurement point is 0°, using the real part R(k) and the imaginary part I(k) of the complex Fourier component of each k-th-order thickness deviation, by $$\arg W(k) \frac{1}{k}\left(\tan^{-1}\frac{I(k)}{R(k)}\right)\frac{180}{\pi},$$

or $$\arg N(k) = \frac{1}{k}\left(\tan^{-1}\frac{I(k)}{R(k)}+\pi\right)\frac{180}{\pi}.$$

3. The thickness deviation information derivation apparatus as set forth in claim 1, wherein the first calculating means calculates a real part R(k) and an imaginary part I(k) of the complex Fourier component of each k-th-order thickness deviation by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, and the second calculating means calculates a thickness deviation amount G(k) of each k-th-order thickness deviation by $$G(k) = 4\sqrt{R(k)^2 + I(k)^2}.$$

4. The thickness deviation information derivation apparatus as set forth in claim 3, wherein the third calculating means calculates a position argW(k) of the thick portion or a position argN(k) of the thin portion of each k-th-order thickness deviation with a unit of angle in which the position of a first measurement point is 0°, using the real part R(k) and the imaginary part I(k) of the complex Fourier component of each k-th-order thickness deviation, by $$\arg W(k) \frac{1}{k}\left(\tan^{-1}\frac{I(k)}{R(k)}\right)\frac{180}{\pi},$$

or $$\arg N(k) = \frac{1}{k}\left(\tan^{-1}\frac{I(k)}{R(k)}+\pi\right)\frac{180}{\pi}.$$

5. A thickness deviation information derivation apparatus for deriving information about a thickness deviation that occurs in a pipe, based on measured values of wall thickness of the pipe, comprising:

first calculating means for calculating a complex Fourier component of a first-order thickness deviation of the wall thickness that changes periodically once in one turn by performing a complex Fourier transform in a circumferential direction on measured values of the wall thickness at a plurality of points in a plurality of cross sections of the pipe in an axial direction;

second calculating means for calculating a thickness deviation amount indicating a degree of thickness deviation of the first-order thickness deviation, from an absolute value of the calculated complex Fourier component, for the plurality of the cross sections in the axial direction;

third calculating means for calculating a phase of the first-order thickness deviation, from the calculated complex Fourier component, for the plurality of the cross sections in the axial direction;

fourth calculating means for calculating a complex Fourier component for each frequency representing the number of times the thickness deviation is twisted per unit length in a longitudinal direction of the pipe, by performing a complex Fourier transform on a complex function in which a complex number whose absolute value and phase are the thickness deviation amount and the phase thus calculated, respectively, is a function of position in the longitudinal direction of the pipe; and determining means for determining whether the values of the complex Fourier component in a plurality of predetermined frequency ranges are larger or not based on a predetermined boundary value.

6. The thickness deviation information derivation apparatus as set forth in claim 5, wherein the first calculating means calculates a real part R(1) and an imaginary part I(1) of the complex Fourier component of the first-order thickness deviation by $$R(1) = \frac{1}{N}\sum_{i=1}^{N}\left\{WT(i)\cos\left(\frac{2\pi}{N}(i-1)\right)\right\},$$

and $$I(1) = \frac{1}{N}\sum_{i=1}^{N}\left\{WT(i)\sin\left(\frac{2\pi}{N}1(i-1)\right)\right\}$$

where N is the number of measurement points at which the wall thickness is measured in the cross section in the axial direction, and WT(i) is a measured value of the wall thickness at the i-th measurement point among the measurement points aligned in the circumferential direction, the second calculating means calculates a thickness deviation amount r of the first-order thickness deviation by $$r = 4\sqrt{R(1)^2 + I(1)^2},$$

the third calculating means calculates a phase θ of the first-order thickness deviation by $$\theta = \tan^{-1}\{I(1)/R(1)\}, \text{ and}$$

the fourth calculating means performs a complex Fourier transform on a function of y, $f(y)=r(y)\cdot\exp(j\cdot\theta(y))$, where j is an imaginary number, y is a length in the longitudinal direction of the pipe, and the r and θ are functions of y.

7. A computer program product for causing a computer to derive information about a thickness deviation that occurs in a pipe, based on wall thickness values of the pipe, wherein said computer program product comprises a computer readable storage medium having computer readable program code means embodied in said medium, said computer readable program code means comprising computer instruction means for:

executing a first calculation step for calculating a complex Fourier component of each k-th-order thickness deviation of the wall thickness that changes periodically k times (k is a natural number) by performing a complex Fourier transform on a series of the wall thickness values of the pipe;

executing a second calculation step for calculating a thickness deviation amount indicating a degree of thickness deviation of each k-th-order thickness deviation, from an absolute value of the calculated complex Fourier component; and executing a third calculation step for calculating a position of a thick portion or thin portion of each k-th-order thickness deviation, from a phase of the calculated complex Fourier component.

8. The computer program product as set forth in claim 7, wherein the third calculation step includes a step for calculating a position argW(k) of the thick portion or a position argN(k) of the thin portion of each k-th-order thickness deviation with a unit of angle, using the real part R(k) and imaginary part I(k) of the complex Fourier component of each k-th-order thickness deviation, by $$\arg W(k) \frac{1}{k}\left(\tan^{-1}\frac{I(k)}{R(k)}\right)\frac{180}{\pi},$$

or

-continued $$\arg N(k) = \frac{1}{k}\left(\tan^{-1}\frac{I(k)}{R(k)} + \pi\right)\frac{180}{\pi}.$$

9. The computer program product as set forth in claim 7, wherein the first calculation step includes a step for calculating a real part R(k) and an imaginary part I(k) of the complex Fourier component of each k-th-order thickness deviation by $$R(k) = \frac{1}{N}\sum_{i=1}^{N}\left\{WT(i)\cos\left(\frac{2\pi}{N}k(i-1)\right)\right\},$$

and $$I(k) = \frac{1}{N}\sum_{i=1}^{N}\left\{WT(i)\sin\left(\frac{2\pi}{N}k(i-1)\right)\right\}$$

where N is the number of the wall thickness values, and WT(i) is the i-th wall thickness value, and the second calculation step includes a step for calculating a thickness deviation amount G(k) of each k-th-order thickness deviation by $$G(k) = 4\sqrt{R(k)^2 + I(k)^2}.$$

10. The computer program product as set forth in claim 9, wherein the third calculation step includes a step for calculating a position argW(k) of the thick portion or a position argN(k) of the thin portion of each k-th-order thickness deviation with a unit of angle, using the real part R(k) and imaginary part I(k) of the complex Fourier component of each k-th-order thickness deviation, by $$\arg W(k) \frac{1}{k}\left(\tan^{-1}\frac{I(k)}{R(k)}\right)\frac{180}{\pi},$$

or $$\arg N(k) = \frac{1}{k}\left(\tan^{-1}\frac{I(k)}{R(k)} + \pi\right)\frac{180}{\pi}.$$

11. A computer program product for causing a computer to derive information about a thickness deviation that occurs in a pipe, based on wall thickness values of the pipe, wherein said computer program product comprises a computer readable storage medium having computer readable program code means embodied in said medium, said computer readable program code means comprising computer instruction means for:

executing a first calculation step for calculating a complex Fourier component of a first-order thickness deviation of the wall thickness that changes periodically once by performing a complex Fourier transform on each of a plurality of series of the wall thickness values;

executing a second calculation step for calculating a thickness deviation amount indicating a degree of thickness deviation of the first-order thickness deviation, from an absolute value of the calculated complex Fourier component, for each of a plurality of series of the wall thickness values;

executing a third calculation step for calculating a phase of the first-order thickness deviation, from the calculated complex Fourier component, for each of a plurality of series of the wall thickness values;

executing a fourth calculation step for calculating a complex Fourier component for each frequency by performing a complex Fourier transform on a relationship between the thickness deviation amount and the phase calculated for each of a plurality of series of the wall thickness values, over a plurality of series of the wall thickness values; and executing a determination step for determining whether values of the complex Fourier component in a plurality of predetermined frequency ranges are larger or not based on a predetermined boundary value.

12. The computer program product as set forth in claim 11, wherein the first calculation step includes a step for calculating a real part R(1) and an imaginary part I(1) of the complex Fourier component of the first-order thickness deviation by $$R(1) = \frac{1}{N}\sum_{i=1}^{N}\left\{WT(i)\cos\left(\frac{2\pi}{N}(i-1)\right)\right\},$$

and $$I(1) = \frac{1}{N}\sum_{i=1}^{N}\left\{WT(i)\sin\left(\frac{2\pi}{N}1(i-1)\right)\right\}$$

where N is the number of the wall thickness values included in a series of the wall thickness values, and WT(i) is the i-th wall thickness value included in the series of the wall thickness values, the second calculation step includes a step for calculating a thickness deviation amount r of the first-order thickness deviation by $$r = 4\sqrt{R(1)^2 + I(1)^2},$$

the third calculation step includes a step for calculating a phase θ of the first-order thickness deviation by $$\theta = \tan^{-1}\{I(1)/R(1)\}, \text{ and}$$

the fourth calculation step includes a step for performing complex Fourier transform on a function of y, f(y)=r(y)·exp(j·θ(y)), where j is an imaginary number, y is a length in a longitudinal direction of the pipe, and the r and θ are functions of y.

* * * * *